(12) United States Patent
Liu et al.

(10) Patent No.: US 11,215,542 B2
(45) Date of Patent: Jan. 4, 2022

(54) ROCK IMPACT LOADING-UNLOADING CONFINING PRESSURE TEST SYSTEM AND USAGE METHOD THEREFOR

(71) Applicant: SHANDONG UNIVERSITY OF SCIENCE AND TECHNOLOGY, Qingdao (CN)

(72) Inventors: Xuesheng Liu, Qingdao (CN); Shilin Song, Qingdao (CN); Yunliang Tan, Qingdao (CN); Deyuan Fan, Qingdao (CN); Jianguo Ning, Qingdao (CN); Qingheng Gu, Qingdao (CN); Ning Jiang, Qingdao (CN); Jun Wang, Qingdao (CN); Qiang Xu, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 30 days.

(21) Appl. No.: 16/652,961

(22) PCT Filed: Feb. 28, 2019

(86) PCT No.: PCT/CN2019/076547
§ 371 (c)(1),
(2) Date: Apr. 1, 2020

(87) PCT Pub. No.: WO2020/010854
PCT Pub. Date: Jan. 16, 2020

(65) Prior Publication Data
US 2020/0319070 A1     Oct. 8, 2020

(30) Foreign Application Priority Data

Dec. 24, 2018 (CN) .......................... 201811579899.1

(51) Int. Cl.
*G01N 3/12* (2006.01)
*G01N 3/307* (2006.01)

(52) U.S. Cl.
CPC ............... *G01N 3/12* (2013.01); *G01N 3/307* (2013.01); *G01N 2203/0026* (2013.01)

(58) Field of Classification Search
CPC .. G01N 3/12; G01N 3/307; G01N 2203/0026; G01N 2203/0256; G01N 2203/0075; G01N 2203/0067
See application file for complete search history.

(56) References Cited

U.S. PATENT DOCUMENTS

| 5,025,668 A | * | 6/1991 | Sarda | G01N 3/10 |
| | | | | 73/795 |
| 9,410,874 B2 | * | 8/2016 | He | G01N 3/24 |
| (Continued) | | | | |

FOREIGN PATENT DOCUMENTS

CN     107014689     *  8/2017     ............... G01N 3/12

OTHER PUBLICATIONS

Translation of CN107014689 (Year: 2017).*

*Primary Examiner* — Natalie Hulis
(74) *Attorney, Agent, or Firm* — CBM Patent Consulting, LLC (57) ABSTRACT

A rock mechanics test system with impact loading-confining pressure unloading and its usage method. The test system includes bearing frame unit, axial compression loading unit, impact loading unit and confining pressure loading unit. The bearing frame unit includes pedestal, column and cross beam. The column is vertically installed on both sides of the upper surface of the pedestal, and the cross beam is horizontally fixed on the upper part of the column. The axial compression loading unit is fixed at the middle position of the upper surface of the pedestal and is used to exert the axial bottom-up pressure to the sample. The impact loading unit
(Continued)

is fixed on the cross beam and is used to exert the axial top-down impact load on the sample.

9 Claims, 4 Drawing Sheets

(56) References Cited

U.S. PATENT DOCUMENTS

| | | | | |
|---|---|---|---|---|
| 10,324,014 | B2* | 6/2019 | Feng | G01N 3/307 |
| 10,365,193 | B2* | 7/2019 | Feng | G01N 3/12 |
| 11,016,010 | B1* | 5/2021 | Li | G01N 3/12 |
| 2011/0107844 | A1* | 5/2011 | Secq | E21B 21/08 |
| | | | | 73/825 |
| 2015/0068319 | A1* | 3/2015 | He | G01N 3/30 |
| | | | | 73/838 |
| 2015/0114084 | A1* | 4/2015 | He | G01N 3/303 |
| | | | | 73/12.13 |
| 2020/0386659 | A1* | 12/2020 | Li | E21B 44/04 |
| 2021/0116341 | A1* | 4/2021 | Zhang | G01N 33/24 |
| 2021/0140861 | A1* | 5/2021 | Zhang | G01N 3/08 |
| 2021/0156775 | A1* | 5/2021 | Guo | G01N 33/42 |

* cited by examiner

ROCK IMPACT LOADING-UNLOADING CONFINING PRESSURE TEST SYSTEM AND USAGE METHOD THEREFOR

TECHNICAL FIELD

The invention relates to the technical field of support for roadway surrounding rock, in particular to a rock mechanics test system with impact loading-confining pressure unloading and its usage method.

TECHNICAL BACKGROUND

Rock burst is a special form of mine pressure appearance. It can be described as that the deformation energy of high strength coal and rock releases instantaneously under the effects of mining and causes strong vibration and extrusion of surrounding rock sin mining influence space. It is one of the most serious natural disasters in the production process of coal mines, and there is generally no obvious macroscopic presage before it occurs. Coal and rock are thrown out suddenly and violently. Rock burst can cause equipment damage, roof fall, roadway blockage and casualties, and it seriously affects the safety and high effective production of coal mines. At present, with the mining depth and intensity increasing in China, rock burst disasters occurs frequently. It poses a great threat to the safety of coal mines and the lives of underground workers. To study the failure characteristics and mechanism of rock burst, it is necessary to explore through theoretical analysis and field observation, and the simulation experiments are also needed.

At present, two experimental methods are generally used to study rock burst in laboratory. One is that the sample is subjected to confining pressure from all directions during the test, and exert directly impact load on the sample. The stress and strain of the sample are obtained without considering unloading of the confining pressure. In the existing technology, there is a true triaxial simulation test system under the three-dimensional rigid loading for rock burst (patent No. CN201410655304.1). By installing the flexible confining load sleeve around the internal pressure chamber, the system solves the mutual influence of deformation in three directions. It also avoids the influence of support effect and simulates rock burst more vividly. When the system is used to study the rock burst, the sample will be always under triaxial pressure. It can well reveal the situation of stress and strain of surrounding rock when the rock burst is coming and the roadway support is not failed. However, it cannot be used to study the changes of stress and strain and the characteristics of deformation and failure of surrounding rock when rock burst causes failure of roadway support.

Another test method is to load the sample first. When the pressure reaches a certain value, remove the boundary constraint of the sample in one direction to unload the confining pressure in this direction, and then observe the failure characteristics of sample during the continuing loading process. In the existing technology, there is a true triaxial test method for simulating shear-type rock burst (patent No. CN201611073980.3). This method uses the true triaxial loading way and boundary conditions with one-sided empty and five-sided forces. It can reproduce the whole process of the gestation and occurrence of shear-type rock burst in the laboratory. However, in site, when rock burst occurs, the roadway will often be in the supporting state, and there will be no one-sided force. This method lacks the simulation of roadway support, and cannot exert impact load. This is inconsistent with the actual situation.

When the rock burst occurs, the huge impact force makes the support method of the roadway suddenly fail, and the surrounding rock is suddenly destroyed by the impact. In fact, it is the mechanical response of coal and rock when one direction of confining pressure is suddenly released under the impact load. However, there is currently no experimental device and method for studying the mechanical properties of rock under impact loading and confining pressure unloading conditions. The existing experimental devices and methods need to be further breakthrough.

THE INVENTION CONTENTS

This invention mainly solves the technical problems existing in the current technology, and provides a rock impact loading and confining pressure unloading test system with simple operation and high test accuracy and its usage method.

The above technical problems of the invention are mainly solved by the following technical solutions:

A rock mechanics test system with impact loading-confining pressure unloading includes:

The bearing frame unit includes pedestal, column and cross beam. The column is vertically installed on both sides of the upper surface of the pedestal, and the cross beam is horizontally fixed on the upper part of the column.

The axial compression loading unit is fixed at the middle position of the upper surface of the pedestal and is used to exert the axialbottom-up pressure to the sample.

The impact loading unit is fixed on the cross beam and is used to exert the axial top-down impact load on the sample.

The confining pressure loading unit is installed between the axial compression loading unit and the impact loading unit, and is used to exert the confining pressure in the horizontal plane to the sample.

The confining pressure unloading unit is used to unload the confining pressure of one side wall direction in the horizontal plane of the sample.

The loading control unit is used to control the axial compression loading unit, the impact loading unit and the confining pressure loading unit for loading respectively.

The monitoring unit is used to monitor the stress, deformation and failure characteristics of the sample during the whole process of loading and unloading.

The data analysis unit is connected to the loading control unit, and is also used to process and analyze the data received from the monitoring unit.

Furthermore, the axial compression loading unit includes an axial compression loading hydro-cylinder, an axial compression loading oil tank and a lower pressure head. The axial compression loading hydro-cylinder is fixed on the pedestal. The axial compression loading oil tank is connected to the axial compression loading hydro-cylinder. One end of the lower pressure head is connected to the axial compression loading hydro-cylinder. The other end extends vertically into the confining pressure loading unit, and is in contact with the lower surface of the sample.

Furthermore, the impact loading unit includes an impact loading hydro-cylinder, an impact loading oil tank, an upper pressure head and a pressure bearing column. The impact loading hydro-cylinder is fixedly connected to the cross beam, and the impact loading hydro-cylinder is connected to the impact loading oil tank. One end of the pressure bearing column is connected to the piston rod of the impact loading hydro-cylinder, and the other end is connected to the top of the upper pressure head. The bottom of the upper pressure head is in contact with the upper surface of the sample.

Furthermore, the confining pressure loading unit includes a pressure chamber, three confining pressure loading hydro-cylinders, a confining pressure loading oil tank and three first lateral pressure heads. The sample is placed in a pressure chamber. The confining pressure loading oil tank is connected to the confining pressure loading hydro-cylinders. The piston rods of the confining pressure loading hydro-cylinders are connected to the first lateral pressure heads. The three first lateral pressure heads extend horizontally into the pressure chamber and are contacted to the three side walls of the sample. The confining pressure unloading unit is installed on the fourth side wall outside of the pressure chamber.

Furthermore, the confining pressure unloading unit includes a second lateral pressure head, a strut, a confining pressure unloading hydro-cylinder, a first pressure sensor and an unloading controller. The second lateral pressure head is installed on the fourth side wall the outside of the pressure chamber, and one end of the second lateral pressure head extends horizontally into the pressure chamber and is contacted to the fourth side wall of the sample. The other end of the second lateral pressure head is hinged to one end of the strut, and the other end of the strut is installed with the pulleys. The confining pressure unloading hydro-cylinder is connected to the confining pressure loading oil tank. The piston rod end of the confining pressure unloading hydro-cylinder is installed with the pulley grooves, and the pulleys of the strut cooperate with the pulley grooves. The inside of the pulley grooves are further installed with the baffles that can be opened and closed. When the baffles are opened, the pulleys can slide freely along the pulley grooves. When the baffles are closed, the pulleys can be locked in the pulley grooves. The first pressure sensor is installed between the second lateral pressure head and the sample. The unloading controller is connected to the first pressure sensor and the baffles respectively.

Furthermore, the monitoring unit includes the second pressure sensor, the strain gauges, a dynamic strain gauge, a high-speed camera and a signal collector. The second pressure sensor is respectively installed between the pressure bearing column and the upper pressure head, and is also installed between the first lateral pressure head and the sample. The strain gauges are installed on the six outer surfaces of the sample. The dynamic strain gauge is connected to the strain gauges. One end of the signal collector is connected to the second pressure sensor, the dynamic strain gauge and the high-speed camera, and the other end is connected to the data analysis unit. The high-speed camera is installed on the same side of the confining pressure unloading unit and corresponds to the position of the sample.

Furthermore, the pressure chamber is made of a transparent material, and the side wall of the pressure chamber is installed with a door that can be opened and closed.

The inside of the pressure chamber is installed with the passages for the signal transmission line.

The method of using the rock impact loading-confining pressure unloading test system of the invention includes the following steps:

Step 1: Make square sample;

Step 2: Place the sample into the pressure chamber, apply pre-tightening force to the sample, and set the limit value of the unloading controller of the confining pressure unloading unit.

Step 3: Apply axial compression and confining pressure to the sample, apply impact load to the sample after reaching the set pressure value.

Step 4: The unloading controller accepts information from the first pressure sensor to determine whether the current pressure value is greater than a set limit value. If not, continue to increase the impact load, if so, the confining pressure unloading unit will remove the confining pressure on one side of the sample.

Step 5: The high-speed camera records the deformation and destruction process of the sample on one side, and the data analysis unit obtains the stress-strain curve of the sample by processing and analyzing the data from the monitoring unit.

Furthermore, the unloading confining pressure process of the confining pressure unloading unit includes: the unloading controller controls the baffles in the pulley grooves at the end of the piston rods of the confining pressure unloading hydro-cylinder to open, so that the pulleys connected to the second lateral pressure head slide along the pulley grooves.

The advantages of this invention lie in:

1. The invention can accurately obtain the mechanical response of the coal and rock when one direction of confining pressure is suddenly released under the impact load. This mechanical condition is basically consistent with the suddenly failure of surrounding rock support structure when the rock burst occurs in-site. In the laboratory, the failure process of surrounding rock support when rock burst occurs is truly reproduced, and the stress, deformation and failure process can be accurately monitored. It can provide more accurate test data support for the study of the mechanism, failure characteristics and prevention of impact dynamic disaster.

2. In the test process, the confining pressure in one direction can be suddenly and quickly unloaded, and the failure phenomenon of surrounding rock support in the roadway is truly simulated. The unloading of confining pressure can be continuously adjusted. The unloading process is automatically controlled, and the test operation is simple.

DESCRIPTION OF FIGURES

In order to illustrate the embodiments of the invention or the technical solutions in the prior art more clearly, a brief introduction to the attached figures required for use in the description of the embodiment or prior art is given below. Obviously, the figures in the following description are only some embodiments of this invention, and those skilled in the art can obtain other figures by the figures without any creative work.

In the figures.

1—the bearing frame unit, 11—pedestal, 12—column, 13—cross beam;

2—the axial compression loading unit, 21—axial compression loading hydro-cylinder, 22—axial compression loading oil tank, 23—lower pressure head;

3—the impact loading unit, 31—impact loading hydro-cylinder, 32—impact loading oil tank, 33—upper pressure head, 34—pressure bearing column;

4—the confining pressure loading unit, 41—pressure chamber, 42—confining pressure loading hydro-cylinders, 43—confining pressure loading oil tank, 44—first lateral pressure heads;

5—the loading control unit;

6—the monitoring unit, 61—second pressure sensor, 62—strain gauges, 63—dynamic strain gauge, 64—high-speed camera, 65—signal collector;

7—data analysis unit;

8—sample;

9—the confining pressure unloading unit; 91—second lateral pressure head, 92—strut, 93—confining pressure unloading hydro-cylinder, 94—first pressure sensor, 95—unloading controller, 96—pulleys, 97—pulley grooves, 98—baffles.

DETAIL IMPLEMENTATION METHOD

The preferred embodiments of the present invention will be described in detail below with reference to the accompanying drawings, in which the advantages and features of the invention can be more readily understood by those skilled in the art. Thus, the scope of protection of the invention is more clearly defined.

Figure 1:
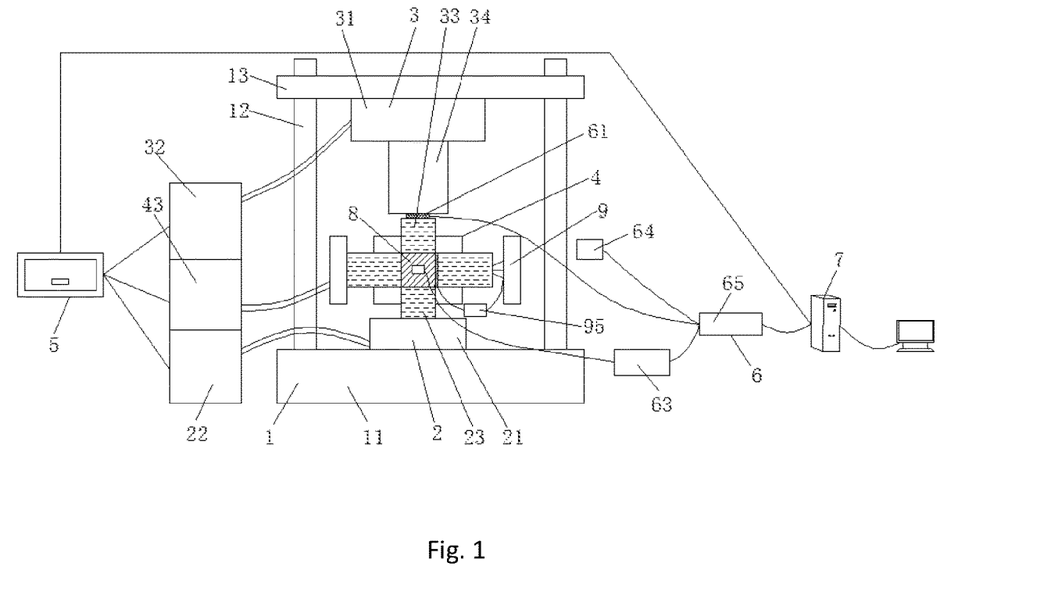
FIG. 1 is a structural schematic diagram of the rock mechanics test system with impact loading-confining pressure unloading.
Figure 2:
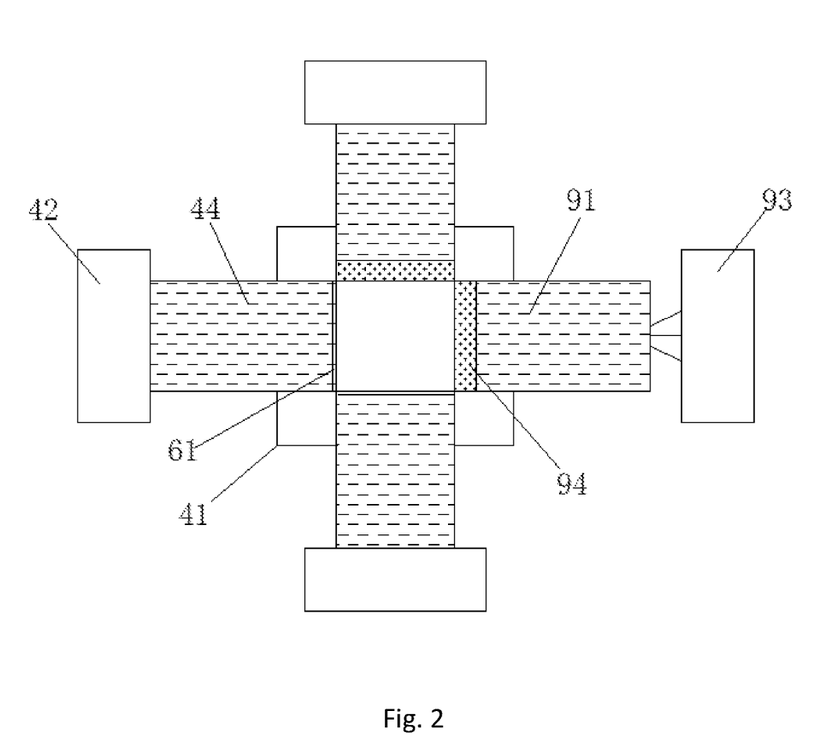
FIG. 2 is the structural schematic diagram of the confining pressure loading unit of the rock mechanics test system with impact loading-confining pressure unloading.

As shown in FIG. 1-2, the rock mechanics test system with impact loading-confining pressure unloading of the invention includes:

The bearing frame unit 1 includes pedestal 11, column 12 and cross beam 13. The column 12 is vertically installed on both sides of the upper surface of the pedestal 11, and the cross beam 13 is horizontally fixed on the upper part of the column 12.

The axial compression loading unit 2 is fixed at the middle position of the upper surface of the pedestal 11 and is used to exert the axial bottom-up pressure to the sample 8.

The impact loading unit 3 is fixed on the cross beam 13 and is used to exert the axial top-down impact load on the sample 8.

The confining pressure loading unit 4 is installed between the axial compression loading unit 2 and the impact loading unit 3, and is used to exert the confining pressure in the horizontal plane to the sample 8.

The confining pressure unloading unit 9 is used to unload the confining pressure of one side wall direction in the horizontal plane of the sample 8.

The loading control unit 5 is used to control the axial compression loading unit 2, the impact loading unit 3 and the confining pressure loading unit 4 for loading respectively.

The monitoring unit 6 is used to monitor the stress, deformation and failure characteristics of the sample 8 during the whole process of loading and unloading.

The data analysis unit 7 is connected to the loading control unit 5, and is also used to process and analyze the data received from the monitoring unit 6.

Specifically, the axial compression loading unit 2 includes an axial compression loading hydro-cylinder 21, an axial compression loading oil tank 22 and a lower pressure head 23. The axial compression loading hydro-cylinder 21 is fixed on the pedestal 11. The axial compression loading oil tank 22 is connected to the axial compression loading hydro-cylinder 21 by tubing, tec. One end of the lower pressure head 23 is connected to the axial compression loading hydro-cylinder 21. The other end extends vertically into the confining pressure loading unit 4, and is in contact with the lower surface of the sample 8. In the invention, the lower pressure head 23 is driven to move upward by the axial pressure loading hydro-cylinder 21, and the axial pressure can be applied to the sample 8.

In the embodiment of the invention, the impact loading unit 3 includes an impact loading hydro-cylinder 31, an impact loading oil tank 32, an upper pressure head 33 and a pressure bearing column 34. The impact loading hydro-cylinder 31 is fixedly connected to the cross beam 13, and the impact loading hydro-cylinder 31 is connected to the impact loading oil tank 32 by tubing, tec. One end of the pressure bearing column 34 is connected to the piston rod of the impact loading hydro-cylinder 31, and the other end is connected to the top of the upper pressure head 33. The bottom of the upper pressure head 33 is in contact with the upper surface of the sample 8. In the invention, an impact load can be applied to the sample 8 by the impact loading hydro-cylinder 31.

In the invention, the confining pressure loading unit 4 includes a pressure chamber 41, three confining pressure loading hydro-cylinders 42, a confining pressure loading oil tank 43 and three first lateral pressure heads 44. The sample 8 is placed in a pressure chamber 41. The confining pressure loading oil tank 43 is connected to the confining pressure loading hydro-cylinders 42. The piston rods of the confining pressure loading hydro-cylinders 42 are connected to the first lateral pressure heads 44. The three first lateral pressure heads 44 are respectively installed in the front side, rear side and left side walls of the pressure chamber 41. The three first lateral pressure heads 44 extend horizontally into the pressure chamber 41 and contact with the front side, rear side and left side walls of the sample 8. The confining pressure unloading unit 9 is installed on the right side outside of the pressure chamber 41. In the invention, by controlling the operation of the confining pressure loading hydro-cylinder 42, the confining pressure can be applied to the front side, the rear side, and the left side of the sample 8. The confining pressure unloading unit 9 can load confining pressure and unload confining pressure to the right side of the pressure chamber 41. In other embodiments of the invention, the distribution positions of the first lateral pressure head 44 and the confining pressure unloading unit 9 can be appropriately set, for example, three first lateral pressure heads 44 are distributed on the front side, the right side and the left side of the sample 8, the confining pressure unloading unit 9 is distributed on the rear side of the sample 8, and so on.

Figure 3:
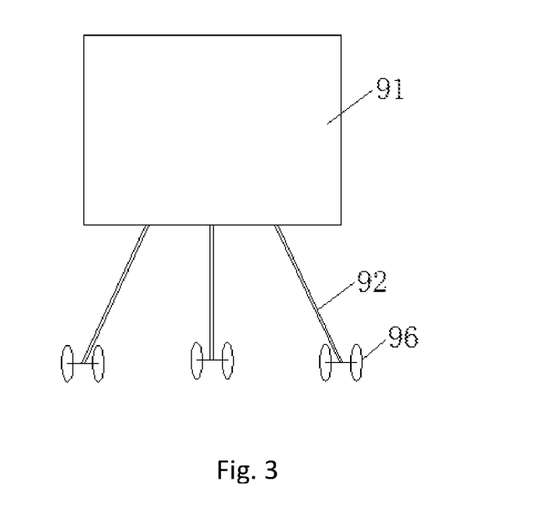
FIG. 3 is a partial structural schematic diagram of the confining pressure unloading unit of the rock mechanics test system with impact loading-confining pressure unloading.
Figure 4:
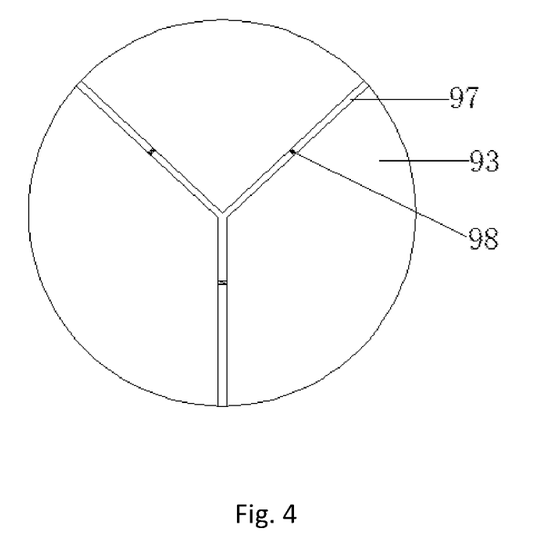
FIG. 4 is another part of the structure schematic diagram of the confining pressure unloading unit of the rock mechanics test system with impact loading-confining pressure unloading.

As shown in FIG. 3-4, the confining pressure unloading unit 9 includes a second lateral pressure head 91, a strut 92, a confining pressure unloading hydro-cylinder 93, a first pressure sensor 94 and an unloading controller 95. One end of the second lateral pressure head 91 extends horizontally into the pressure chamber 41 and is contacted to the right side wall of the sample 8. The other end of the second lateral pressure head 91 is hinged to one end of the strut 92, and the other end of the strut 92 is installed with the pulleys 96. The confining pressure unloading hydro-cylinder 93 is connected to the confining pressure loading oil tank 43. The piston rod end of the confining pressure unloading hydro-cylinder 93 is installed with the pulley grooves 97, and the pulleys 96 cooperate with the pulley grooves 97. The inside of the pulley grooves 97 are further installed with the baffles 98 that can be opened and closed. When the baffles 98 are opened, the pulleys 96 can slide freely along the pulley grooves 97. When the baffles 98 are closed, the pulleys 96 can be locked in the pulley grooves 97.

The first pressure sensor 94 is installed between the second lateral pressure head 91 and the sample 8 for detecting the pressure of the outer surface of the sample 8. The unloading controller 95 is respectively connected to the first pressure sensor 94 and the baffles 98. The unloading controller 95 can control the opening or closing of the baffles 98. In the invention, the number of pulley grooves 97 is the same as the struts 92, and the baffles 98 can be a baffle made of metal and other materials.

Figure 5:
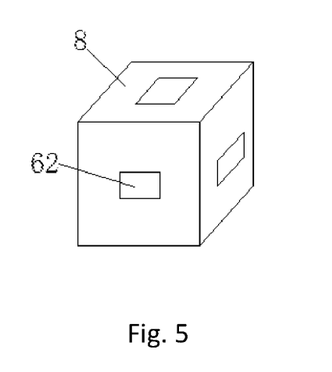
FIG. 5 is a schematic diagram of the installation position of the strain gauge of the rock mechanics test system with impact loading-confining pressure unloading.

As shown in FIG. 5, the monitoring unit 6 includes the second pressure sensor 61, the strain gauges 62, a dynamic strain gauge 63, a high-speed camera 64 and a signal collector 65. The second pressure sensor 61 is respectively installed between the pressure bearing column 34 and the upper pressure head 33, and is also installed between the first lateral pressure head 44 and the sample 8. The strain gauges 62 are installed on six outer surfaces of the sample 8. The dynamic strain gauge 63 is connected to the strain gauges 62. One end of the signal collector 65 is connected to the second pressure sensor 61, the dynamic strain gauge 63 and the high-speed camera 64, and the other end is connected to the data analysis unit 7. The high-speed camera 64 is installed on the same side of the confining pressure unloading unit 9 and corresponds to the position of the sample 8. The high speed camera 64 is used to capture images of the deformation of the sample 8. In the invention, the monitoring unit 6 is used to monitor the stress, deformation and damage during the loading and unloading process of the sample 8.

Preferably, the pressure chamber 41 is made of a transparent material, and the side wall of the pressure chamber 41 is installed with a door that can be opened and closed. The inside of the pressure chamber 41 is further installed with the passage for the signal transmission line, which can facilitate the wiring of the first and second pressure sensors.

Figure 6:
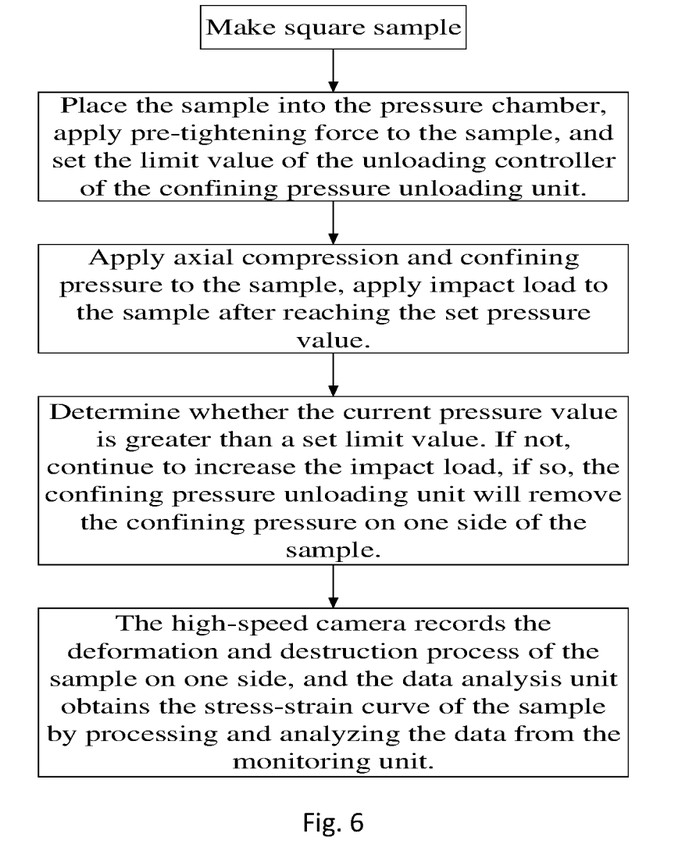
FIG. 6 is a method flow chart of the use method of the rock mechanics test system with impact loading-confining pressure unloading.

As shown in FIG. 6, The method of using the rock impact loading-confining unloading pressure test system of the present invention includes the following steps:

Step 1: Make square sample 8;

Step 2: Place the sample 8 into the pressure chamber 41, apply pre-tightening force to the sample 8, and set the limit value of the unloading controller 95 of the confining pressure unloading unit 9. Specifically, open the chamber door of the pressure chamber 41, place the sample 8 on the lower pressure head 23, and connect the confining pressure unloading unit 9 in turn. Close the inner baffles 98 of the pulley grooves 97, make the pulleys 96 stay at the baffles 98, and adjust the position of each pressure head. At the same time, the confining pressure loading hydro-cylinder 42 and the axial pressure loading hydro-cylinder 21 are controlled to apply a preload force to the sample 8.

Step 3: Apply axial compression and confining pressure to the sample 8, apply impact load to the sample 8 after reaching the set pressure value. Specifically, apply the axial pressure and confining pressure to the sample 8 by the axial pressure loading unit 2 and the confining pressure loading unit 4, and apply the impact load to the sample 8 by the impact loading unit 3.

Step 4: The unloading controller 95 accepts information from the first pressure sensor 94 to determine whether the current pressure value is greater than a set limit value. If not, continue to increase the impact load, if so, the confining pressure unloading unit 9 will remove the confining pressure quickly on one side of the sample 8.

Step 5: The high-speed camera 64 records the deformation and destruction process of the sample 8 on one side, and the data analysis unit 7 obtains the stress-strain curve of the sample 8 by processing and analyzing the data from the monitoring unit 6.

In the invention, the unloading confining pressure process of the confining pressure unloading unit 9 includes: the unloading controller 95 controls the baffles 98 in the pulley grooves 97 at the end of the piston rods of the confining pressure unloading hydro-cylinder 93 to open, so that the pulleys 96 connected to the second lateral pressure head 91 slide along the pulley grooves 97.

Above all, the advantages of this invention lie in:

1. The invention can accurately obtain the mechanical response of the coal and rock when one direction of confining pressure is suddenly released under the impact load. This mechanical condition is basically consistent with the suddenly failure of surrounding rock support structure when the rock burst occurs in-site. In the laboratory, the failure process of surrounding rock support when rock burst occurs is truly reproduced, and the stress, deformation and failure process can be accurately monitored. It can provide more accurate test data support for the study of the mechanism, failure characteristics and prevention of impact dynamic disaster.

2. In the test process, the confining pressure in one direction can be suddenly and quickly unloaded, and the failure phenomenon of surrounding rock support in the roadway is truly simulated. The unloading of confining pressure can be continuously adjusted, the unloading process is automatically controlled, and the test operation is simple.

The above is only a specific embodiment of the present invention, but the scope of protection of the present invention is not limited thereto. Any change or substitution not through creative work shall be covered within the scope of protection of the invention. Therefore, the scope of protection of the invention shall be based on the scope of protection defined in the claims.

What is claimed is:

1. A rock mechanics test system with impact loading-confining pressure unloading comprising:

a bearing frame unit includes pedestal, column and cross beam; the column is vertically installed on both sides of the upper surface of the pedestal, and the cross beam is horizontally fixed on the upper part of the column;

an axial compression loading unit is fixed at the middle position of the upper surface of the pedestal and is used to exert the axial bottom-up pressure to a sample;

an impact loading unit is fixed on the cross beam and is used to exert the axial top-down impact load on the sample;

a confining pressure loading unit is installed between the axial compression loading unit and the impact loading unit, and is used to exert the confining pressure in the horizontal plane to the sample;

wherein, a confining pressure unloading unit is used to unload the confining pressure of one side wall direction in the horizontal plane of the sample;

a loading control unit is used to control the axial compression loading unit, the impact loading unit and the confining pressure loading unit for loading, respectively;

a monitoring unit is used to monitor the stress, deformation and failure characteristics of the sample during the whole process of loading and unloading;

a data analysis unit is connected to the loading control unit, and is also used to process and analyze the data received from monitoring unit;

wherein the confining pressure loading unit includes a pressure chamber, three confining pressure loading hydro-cylinders, a confining pressure loading oil tank and three first lateral pressure heads, the sample is placed in a pressure chamber; the confining pressure loading oil tank is connected to the confining pressure loading hydro-cylinders; the piston rods of the confining pressure loading hydro-cylinders are connected to the three first lateral pressure heads; the three first lateral pressure heads extend horizontally into the pressure chamber and are contacted to the three side walls of the sample; the confining pressure unloading unit is installed on the fourth side wall outside of the pressure chamber.

2. The rock mechanics test system with impact loading-confining pressure unloading according to claim 1, wherein the axial compression loading unit includes an axial compression loading hydro-cylinder, an axial compression loading oil tank and a lower pressure head; the axial compression loading hydro-cylinder is fixed to the pedestal; the axial compression loading oil tank is connected to the axial compression loading hydro-cylinder; one end of the lower pressure head is connected to the axial compression loading hydro-cylinder; the other end extends vertically into the confining pressure loading unit, and is in contact with the lower surface of the sample.

3. The rock mechanics test system with impact loading-confining pressure unloading according to claim 1, wherein the impact loading unit includes an impact loading hydro-cylinder, an impact loading oil tank, an upper pressure head and a pressure bearing column; the impact loading hydro-cylinder is fixedly connected to the cross beam, and the impact loading hydro-cylinder is connected to the impact loading oil tank; one end of the pressure bearing column is connected to the piston rod of the impact loading hydro-cylinder, and the other end is connected to the top of the upper pressure head; the bottom of the upper pressure head is in contact with the upper surface of the sample.

4. The rock mechanics test system with impact loading-confining pressure unloading according to claim 1, wherein the confining pressure unloading unit includes a second lateral pressure head, a strut, a confining pressure unloading hydro-cylinder, a first pressure sensor and an unloading controller; the second lateral pressure head is installed on the fourth side wall outside of the pressure chamber, and one end of the second lateral pressure head extends horizontally into the pressure chamber and is contacted to the fourth side wall of the sample; the other end of the second lateral pressure head is hinged to one end of the strut, and the other end of the strut is installed with the pulleys; the confining pressure unloading hydro-cylinder is connected to the confining pressure loading oil tank; the piston rod end of the confining pressure unloading hydro-cylinder is installed with the pulley grooves, and the pulleys of the strut cooperate with the pulley grooves; the inside of the pulley grooves are further installed with baffles that can be opened and closed; when the baffles are opened, the pulleys can slide freely along the pulley grooves; when the baffles are closed, the pulleys can be locked in the pulley grooves; a first pressure sensor is installed between the second lateral pressure head and the sample; an unloading controller is connected to the first pressure sensor and the baffles, respectively.

5. The rock mechanics test system with impact loading-confining pressure unloading according to claim 3, wherein the monitoring unit includes a second pressure sensor, strain gauges, a dynamic strain gauge, a high-speed camera and a signal collector; the second pressure sensor is respectively installed between the pressure bearing column and the upper pressure head, and is also installed between one of the three first lateral pressure heads and the sample; the strain gauges are installed on six outer surfaces of the sample; the dynamic strain gauge is connected to the strain gauges; one end of the signal collector is connected to the second pressure sensor, the dynamic strain gauge and the high-speed camera, and the other end is connected to the data analysis unit; the high-speed camera is installed on the same side of the confining pressure unloading unit and corresponds to the position of the sample.

6. The rock mechanics test system with impact loading-confining pressure unloading according to claim 1, wherein the pressure chamber is made of a transparent material, and the side wall of the pressure chamber is installed with a door that can be opened and closed; the inside of the pressure chamber is installed with a passage for a signal transmission line.

7. A method for using the rock impact loading-confining unloading pressure rock mechanics test system of claim 1 comprising the following steps:

step 1: make square sample;

step 2: place the sample into a pressure chamber, apply pre-tightening force to the sample, and set a limit value of an unloading controller of the confining pressure unloading unit;

step 3: apply axial compression and confining pressure to the sample, apply impact load to the sample after reaching a set pressure value;

step 4: the unloading controller accepts information from a first pressure sensor to determine whether the current pressure value is greater than the limit value; if not, continue to increase the impact load, if so, the confining pressure unloading unit will remove the confining pressure on one side of the sample;

step 5: a high-speed camera records the deformation and destruction process of the sample on one side, and the data analysis unit obtains the stress-strain curve of the sample by processing and analyzing the data from the monitoring unit.

8. The method for using the rock impact loading-confining unloading pressure rock mechanics test system according to claim 7, wherein an unloading confining pressure process of the confining pressure unloading unit includes: the unloading controller controls baffles in pulley grooves at the end of the piston rods of the confining pressure unloading hydro-cylinder to open, so that pulleys connected to a second lateral pressure head slide along the pulley grooves.

9. The method for using the rock impact loading-unloading pressure rock mechanics test system according to claim 7 further comprising the following steps:

step 1: make square sample (8);

step 2: open a chamber door of the pressure chamber (41), place the sample (8) on a lower pressure head (23), and connect the confining pressure unloading unit (9) in turn; close inner baffles (98) of pulley grooves (97), make pulleys (96) stay at the inner baffles (98), and adjust position of the lower pressure head; at the same time, a confining pressure loading hydro-cylinder (42)

and an axial pressure loading hydro-cylinder (21) are controlled to apply a preload force to the sample (8);

step 3: apply the axial pressure and confining pressure to the sample (8) by the axial pressure loading unit (2) and the confining pressure loading unit 4, and apply the impact load to the sample (8) by the impact loading unit (3);

step 4: the unloading controller (95) accepts information from the first pressure sensor (94) to determine whether the current pressure value is greater than the limit value, if not, continue to increase the impact load, if so, the unloading controller (95) controls the baffles (98) in the pulley grooves (97) at the end of the piston rods of the confining pressure unloading hydro-cylinder (93) to open, so that the pulleys (96) connected to a second lateral pressure head (91) slide along the pulley grooves; it enables the confining pressure unloading unit (9) to quickly remove the confining pressure on one side of the sample (8);

step 5: the high-speed camera (64) records the deformation and destruction process of the sample (8) on one side, and the data analysis unit (7) obtains the stress-strain curve of the sample (8) by processing and analyzing the data from the monitoring unit (6).

\* \* \* \* \*